(12) United States Patent
Govindaswamy et al.

(10) Patent No.: US 8,194,987 B2
(45) Date of Patent: Jun. 5, 2012

(54) DIGITAL IMAGE ENCODING

(75) Inventors: Senthil Govindaswamy, San Diego, CA (US); Brian Fudge, San Diego, CA (US); Ann C. Irvine, Bonsall, CA (US); Kadayam Thyagarajan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1279 days.

(21) Appl. No.: 11/843,476

(22) Filed: Aug. 22, 2007

(65) Prior Publication Data

US 2007/0286278 A1 Dec. 13, 2007

Related U.S. Application Data

(62) Division of application No. 10/630,510, filed on Jul. 29, 2003, now Pat. No. 7,856,149.

(60) Provisional application No. 60/399,955, filed on Jul. 29, 2002.

(51) Int. Cl.
*G06K 9/36* (2006.01)

(52) U.S. Cl. ........................................ 382/232

(58) Field of Classification Search .................. 382/166, 382/232–251; 375/240.02, 240.14; 358/539
See application file for complete search history.

(56) References Cited

U.S. PATENT DOCUMENTS

| | | | |
|---|---|---|---|
| 5,021,891 A | 6/1991 | Lee | |
| 5,107,345 A | 4/1992 | Lee | |
| 5,452,104 A | 9/1995 | Lee | |
| 5,576,767 A | 11/1996 | Lee et al. | |
| 5,629,780 A | 5/1997 | Watson | |
| 5,692,074 A | 11/1997 | Kunitake | |
| 5,990,955 A | 11/1999 | Koz | |
| 6,044,115 A | 3/2000 | Horiike et al. | |
| 6,097,844 A | 8/2000 | Melen | |
| 6,366,705 B1 | 4/2002 | Chiu et al. | |
| 6,411,738 B2 | 6/2002 | Fert et al. | |
| 6,882,753 B2 | 4/2005 | Chen et al. | |
| 6,985,589 B2 | 1/2006 | Morley et al. | |
| 2002/0021754 A1 | 2/2002 | Pian et al. | |
| 2002/0056081 A1 | 5/2002 | Morley et al. | |

FOREIGN PATENT DOCUMENTS

| | | |
|---|---|---|
| EP | 0785689 | 7/1997 |
| TW | 390097 | 5/2000 |
| TW | 404136 | 9/2000 |
| WO | 99007158 | 2/1999 |
| WO | 99057884 | 11/1999 |
| WO | 00018131 | 3/2000 |

OTHER PUBLICATIONS

Supplemental European Search Report—EP03772118—European Search Authority—Munich—Jul. 1, 2009.

(Continued)

*Primary Examiner* — Duy M Dang
(74) *Attorney, Agent, or Firm* — Elaine H. Lo

(57) ABSTRACT

An apparatus and method for limiting bit rate of compressed data is disclosed. The apparatus and method allows the generation of parameters for encoding digital image data based on the data bit rate resulting from the use of different parameters. In one embodiment, a statistical analysis is performed to determine the different parameters. The use of parameters results in a bit rate that would prevent a decoder to stall during decompression while allowing the encoder compress without affecting the quality. Therefore, a more efficient encoding and decoding can be achieved.

48 Claims, 5 Drawing Sheets

OTHER PUBLICATIONS

Matthew Crouse et al: "Joint Thresholding and Quantizer Selection for Transform Image Coding: Entropy—Constrained Analysis and Applications to Baseline JPEG" IEEE Transactions on Image Processing, IEEE Service Center, Piscataway, NJ, US, vol. 6, No. 2, Feb. 1, 1997, XP011026108 ISSN: 1057-71 49.

Hemami, S.S., "Robust Image Transmission Using Resynchronizing Variable-Length Codes and Error Concealment," IEEE Journal of Selected Areas in Communications, Jun. 2000, vol. 18, Issue 6, pp. 927-939.

Lee et al.,"Video traffic prediction using source information for renegotiated CBR", Electronics letters, vol. 36, No. 25, Dec 7, 2000, pp. 2072-2073.

International Search Report—PCT/US2003/02386 International Search Authority—U.S—Jan. 12, 2004.

International Preliminary Examination Report—PCT/US2003/023860, International Search Authority—U.S.—Mar. 4, 2005.

DIGITAL IMAGE ENCODING

CROSS-REFERENCE TO RELATED APPLICATIONS

This application claims priority from U.S. Provisional Patent Application Ser. No. 60/399,955, filed Jul. 29, 2002, and is a divisional of U.S. patent application Ser. No. 10/630, 510, filed Jul. 29, 2003, entitled "DIGITAL IMAGE ENCODING," the entire content of which is herein incorporated by reference.

BACKGROUND

I. Field of Invention

The invention generally relates to data compression, and more particularly to generation of encode parameters for digital image data compression.

II. Description of the Related Art

Compression is a key factor of multimedia distribution and/or presentation. An effective digital compression can reduce the cost as well as increase the quality of decompressed image information presented in digital communication systems. One application of digital compression technique is in the motion picture industry, or more particularly, in "digital cinema" systems.

Generally defined, digital cinema refers to the electronic distribution and display of high quality film which have been converted to a digital electronic representation for storage, transmission, and display purposes. Because of the amount of data, films in digital electronic representation are compressed and distributed for playback. While there are various compression algorithms to reduce the bit rate for the storage and/or transmission of high quality electronic images, even the most efficient compression can result in some compressed image portions with a high bit rate due to factors such as the amount of detail or the arrangement of details in an image frame.

However, a high bit rate can potentially stall and/or stop a decoder from playback of a film. Therefore, compressed image portions having a high bit rate can stall and/or stop a decoder and there is need to monitor and control the compressed data bit rate.

SUMMARY

Embodiments disclosed herein address the above stated needs by providing a method for security in a data processing system. The embodiments allow generation of a set of parameters for encoding digital image information. The parameters can be determined to result in a compressed data bit rate below a selected threshold such that a decoder will not stop during playback of a film. Therefore, the compressed data bit rate can be controlled and limited based on the parameters.

In one embodiment, an apparatus comprises a source generator configured to convert image information into digital image information. An encoder coupled to the source generator is configured to receive the digital image information from the source generator and comprises a parameter generator coupled to a first image compressor. The parameter generator outputs at least a first set of parameters and the first image compressor compresses the digital image information using the first set of parameters.

The parameter generator may comprise a second image compressor coupled to a processor. The processor outputs a second set of parameters and the second image compressor compresses the digital information using the second set of parameters. The processor adjusts the second set of parameters and outputs a third set of parameters as the second set of parameters, if the use of the second set of parameters results in a selected data bit rate, and otherwise, outputs the second set of parameters as the first set of parameters. Alternatively, the parameter generator may comprise a processor to output the first set of parameters. The processor then adjusts the first set of parameters to generate a second set of parameters if the use of the first set of parameters results in a selected data bit rate, and outputs the second set of parameters as the first set of parameters.

In another embodiment, a method for encoding digital image information comprises generating and outputting at least a first set of parameters, compressing the digital image information using the first set of parameters, and adjusting the first set of parameters to generate a second set of parameters if the use of the first set of parameters results in a selected data bit rate, and outputting the second set of parameters as the first set of parameters. Here, the first set of parameters can be adjusted based on a statistical analysis.

In a further embodiment, an apparatus for encoding digital image information comprises means for outputting at least a first set of parameters, and first means for compressing the digital image information using the first set of parameters. Here, the means for outputting at least the first set of parameters may comprise second means for compressing the digital information using a second set of parameters, means for outputting the second set of parameters, means for adjusting the second set of parameters to generate a third set of parameters, and means for outputting the third set of parameters as the second set of parameters if the use of the second set of parameters results in a selected data bit rate, and otherwise, outputting the second set of parameters as the first set of parameters. Alternatively, the means for outputting at least the first set of parameters may comprise means for adjusting the first set of parameters to generate a second set of parameters if the use of the first set of parameters results in a selected data bit rate; and means for outputting the second set of parameters as the first set of parameters.

BRIEF DESCRIPTION OF THE DRAWINGS

Various embodiments will be described in detail with reference to the following drawings in which like reference numerals refer to like elements, wherein.

DETAILED DESCRIPTION

Generally, the embodiments described allow the generation of final parameters for encoding data. In one embodiment, the parameters are generated or set based on the data bit rate resulting from the use of the parameters. More particularly, final parameters may be generated such that the data bit rate resulting from the use of the parameters does not exceed a selected or target data bit rate. The selected data bit rate depends on different implementations of the embodiments. For example, the selected threshold may be a maximum bit rate as allowed by a limited bandwidth. In some implementations, buffering may be available to allow a bit rate that can go above the maximum bit rate for a certain time period. Accordingly, in some embodiments, the selected threshold may be an average bit rate over a certain time period.

In one application, parameters can be generated for encoding digital image information. Therefore, the embodiments may be implemented in digital cinema to generate parameters for encoding digital image information.

Digital cinema may include the electronic generation, compression, encryption, and storage of audio/visual programming, such as motion pictures in theater systems, theaters, theater complexes, and/or presentation systems. Accordingly, the invention is applicable to the presentation of image and audio information in a variety of locations such as theatre or theatre complex, outdoor amphitheaters, drive-in complexes, civic auditoriums, schools and specialty restaurants. For purposes of the explanation, the invention will be described with reference to a theatre or theatre complex. However, those skilled in the art will readily understand that the invention may be applied to other types of locations, systems and fields.

Also, as disclosed herein, the term "program" refers to one or more films for display in cinemas, televisions, and/or any other presentation systems and/or locations.

The term "film" refers to any moving picture including, but not limited to, a full or portion of motion picture, a video clip, a commercial, a drama or a combination thereof.

Image portion of films may consist of single frames (i.e. still images), a sequence of single frame still images, or motion image sequences of short or long duration. The term "storage medium" refers to any one or more storage means including buffers, high capacity data storage devices such as a digital versatile disk (DVD) or a removable hard drive (RHD). The terms "encryption" refers to any means of processing digital data streams of various sources using any of a number of cryptographic techniques to scramble, cover, or directly encrypt said digital streams using sequences generated using secret digital values ("keys") in such a way that it is very difficult to recover the original data sequence without knowledge of the secret key values.

Figure 1:
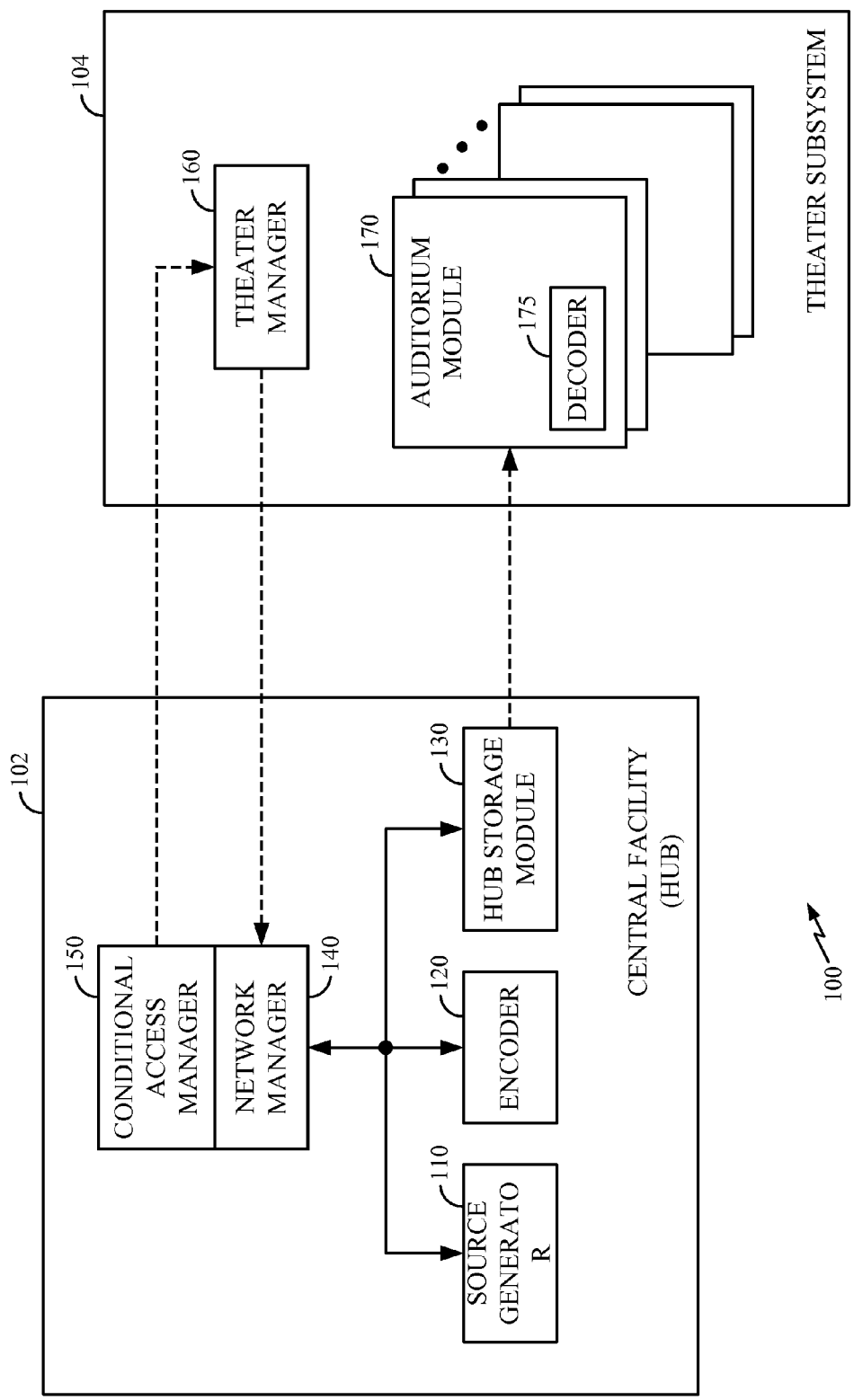
FIG. 1 shows one embodiment of a digital cinema system.

One embodiment of a digital cinema system 100 is illustrated in FIG. 1. The digital cinema system 100 comprises two main systems: at least one central facility or hub 102 and at least one presentation or theater subsystem 104. The hub 102 and the theater subsystem 104 may be implemented by a design similar to that of pending U.S. patent application Ser. Nos. 09/564,174 and 09/563,880, both filed on May 3, 2000 and assigned to the same assignee as the present invention, both herein incorporated by reference.

Generally, the hub 102 includes a source generator 110 to receive and convert program material into a digital version of the program. The digital information is compressed using a preselected format or process by an encoder 120 and stored on a storage medium by a hub storage module 130. Here, the program material includes one or both image information and audio information. Accordingly, the digital information may include one or both digital image information and audio information. A network manager 140 monitors and sends control information to the source generator 110, the encoder 120, and the hub storage module 130. The digital information may also be encrypted by the encoder 120. In such case, the hub 102 may optionally include a conditional access manager 150 to provide specific electronic keying information such that only specific locations, for example theatres, are authorized to show specific programs.

It is to be noted that, although the source generator 110 and the encoder 120 are parts of the hub 102 as shown in FIG. 1, either or both the source generator 110 and the encoder 120 can be located in separate facilities such as a film or television production studio. Also, some data may not require conversion by the source generator 110. For example, digital information may be provided to the encoder 120 through a digital camera or any other digital information generation device.

The theatre subsystem 104 may include a theatre manager 160 that controls one or more auditorium modules 170, each auditorium module 170 comprising a decoder 175. Under the control of the theatre manager 160, compressed digital information from the hub 102 is received, decoded by the decoder 175, decrypted (if necessary) and played by the auditorium modules 170. The compressed information may be received through a storage medium or may be transmitted in real-time. Also, the compressed information may be prepared into a selected sequence, size and data rate prior to being decoded.

Typically, the data stream input to the encoder 120 is composed of image frames. An image frame can generally be divided into slices, a slice can be divided into data blocks, and a data block can be divided into pixels which are the smallest units of an image. Each image frame includes an integer number of slices and each image slice represents the image information for a set of 16 consecutive scan lines. In such case, each data block corresponds to a 16×16 pixel block across the image of the frame. Also, a frame may be separated into even and odd slices, thereby forming even half frame and odd half frame. In one embodiment, half frames are the fundamental packets of compressed data information that are processed by a decoder. Moreover, an image pixel can be commonly represented in the Red, Green and Blue (RGB) color component system. However, because the human eye is more sensitive to changes in luminance and less sensitive to changes in chrominance, the YCbCr color space is typically used in video compression to represent image pixels. The YCbCr color space is a linear transformation of the RGB components, where Y is the chrominance component, and Cb and Cr are the color components. If a frame is separated into even/odd frames, there would be three even half frames and three odd half frames corresponding to the components Y, Cb and Cr.

In the description above, a slice can represent a set of consecutive scan lines other than 16 consecutive scan lines. Also, a different color space with the same or different number of color components may be used to represent an image pixel.

Figure 2:
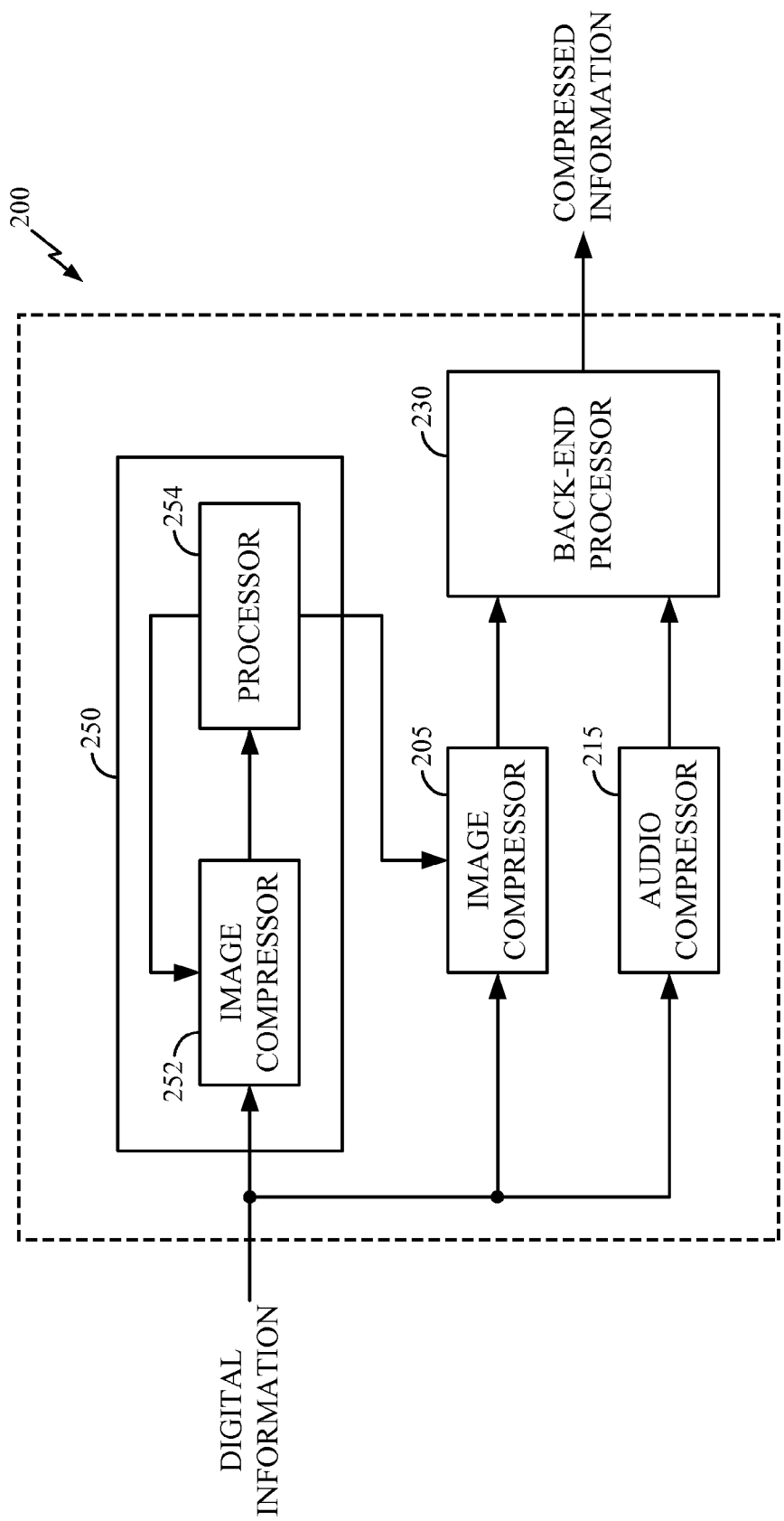
FIG. 2 shows one embodiment of an encoder.

FIG. 2 shows one embodiment of an encoder 200 comprising an image compressor 205, an audio compressor 215, a back-end processor 230, and a parameter generator 250. When the encoder 200 receives digital information, the parameter generator 250 generates and outputs final encode parameters for at least digital image data compression. The image compressor 205 then compresses the digital image information using the final encode parameters from the parameter generator 250.

The image compressor 205 may compress the digital image data on a region-by-region basis. Here a region may be a portion of an image frame, a image frame, or a plurality of image frames. The encoder 200 may include a storage medium (not shown), such as a buffer, that allows the digital image data to be compressed on a region-by-region basis. Moreover, the image compressor 205 may compress the digital image information using any number of compression techniques. Depending on the compression technique, the parameter generator 250 generates and outputs one or more types of encode parameters, hereinafter called set of parameters. To generate the final set of parameters, the parameter generator 250 may include a second image compressor 252 and a processor 254 coupled to the image compressors 205 and 252.

The digital image information is initially compressed by the second image compressor 252 using a first set of parameters. The image compressor 252 compresses the digital image information in a process that is analogous to the compression process of the image compressor 205. Also, the first set of parameters may be a default set of parameters stored in the system or may be manually selected by a system user during the encoding process. After compression, the processor 254 analyzes the bit rate generated for the compressed data.

In one embodiment, the processor 254 determines whether the use of the first set of parameters results in any regions of compressed data with a selected data bit rate.

For example, the processor 254 sets a condition to determine whether the resulting data bit rate is greater than a selected threshold. Depending on the system, the selected threshold may be set to be a maximum bit rate as allowed by a limited bandwidth and/or an average bit rate over a certain time period.

If the condition is not met for a region, the processor 254 may automatically change or adjust one or more of the parameters to generate a second set of parameters.

The second set of parameters is output as the first set of parameters and the region that failed the condition is compressed again by the image compressor 252 using the new first set of parameters. When the data bit rate meets the set condition, the processor 254 outputs the generated set of parameters as the final set of parameters and the digital image information is compressed by the image compressor 205 using the final set of parameters from the processor 254.

In another embodiment, the processor 254 automatically displays to a system user, the regions of compressed data with a selected data bit rate. For example, the regions with a data bit rate greater than a selected threshold may be displayed. Based upon the display, the system user may adjust one or more of the parameters to generate a second set of parameters and the second set of parameters is output as the first set of parameters. Such regions are then compressed again by the image compressor 252 using the new first set of parameters. When there are no regions with a selected data bit rate, the processor 254 outputs the generated first set of parameters as the final set of parameters to the compressor 205.

The audio portion of the digital information is generally passed to an audio compressor 215 for compression. The audio compressor 215 may also compress the digital audio image information using any number of compression techniques. The compressed digital information is received and processed by the back-end processor 230. For example, the compressed image and audio information may be encrypted using any one of a number of known encryption techniques. The compressed information may be multiplexed along with synchronization information and packetized. Here, the synchronization information allows the image and audio streamed information to be played back in a time aligned manner at the theater subsystem 104. In another embodiment, the image and audio information may also be treated separately, rather than multiplexed, and separately packetized. The processed image and audio information may be sent to the hub storage medium 130 for storage on a storage medium.

In the above embodiment, the digital image and audio information may be stored in frame buffers (not shown) before compression. Also, one or more of the image compressor 205, audio compressor 215, back-end processor 230 and parameter generator 250 may be implemented on one or more than one Application-Specific Integrated Circuits (ASIC) or circuit card assemblies. Moreover, one or more of the image compressor 205, audio compressor 215, back-end processor 230 and parameter generator 250 may be implemented by software, firmware, or a combination of software, firmware and hardware. In one embodiment, the parameter generator 250 is implemented in a first ASIC and the image compressor 205 is implemented in a second ASIC. Two ASICs are offset in frame time such that one ASIC provides the encode parameters that the second ASIC uses to compress data.

Figure 3:
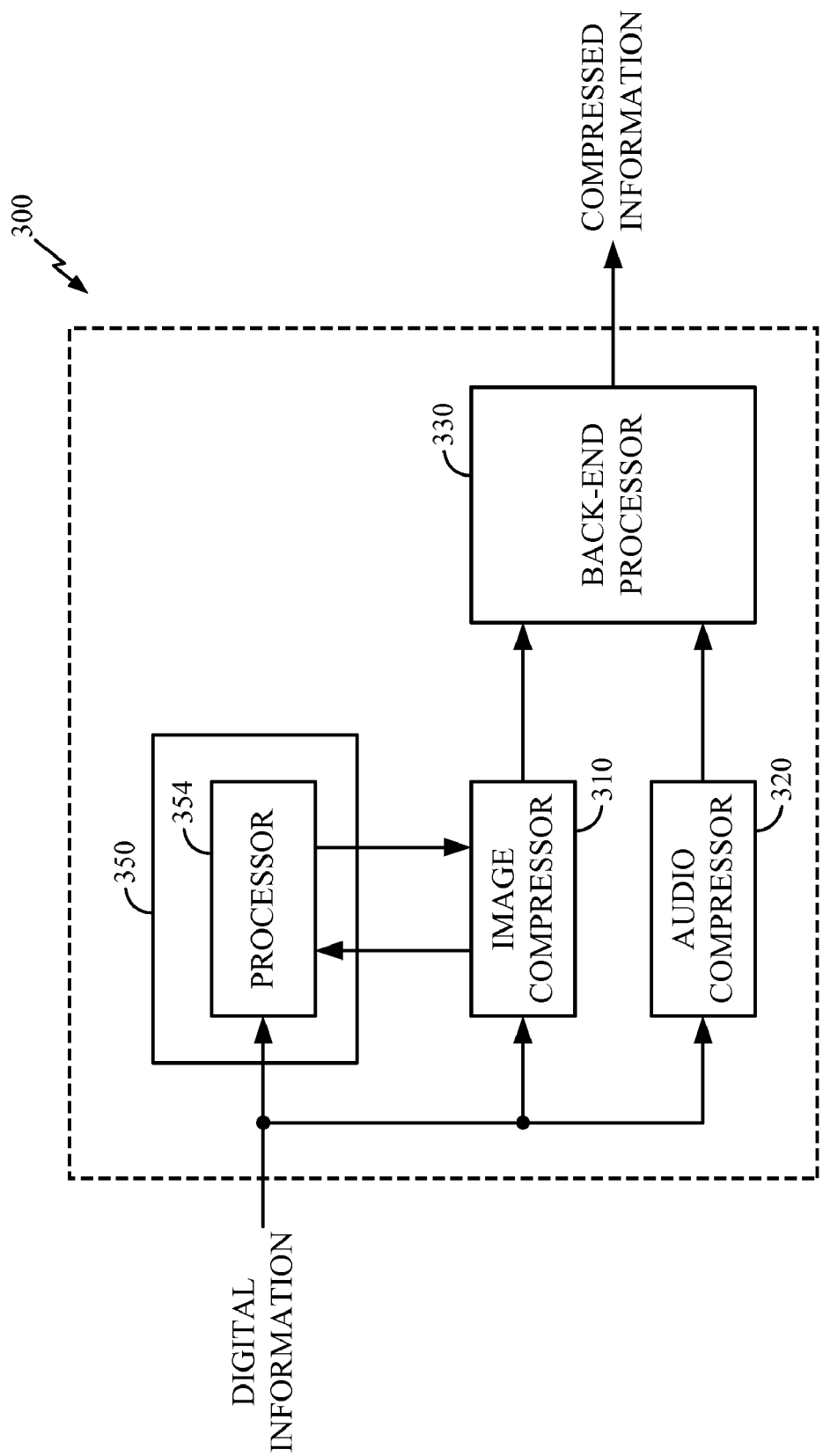
FIG. 3 shows another embodiment of an encoder.

FIG. 3 shows another embodiment of an encoder 300 comprising an image compressor 310, an audio compressor 320, a back-end processor 330 and a parameter generator 350. Similar to the encoder 200, the parameter generator 250 outputs a set of parameters for at least digital image data compression when the encoder 200 receives digital information. The image compressor 310 compresses the digital image information using the set of parameters from the parameter generator 350.

As in encoder 200, the image compressor 305 of encoder 300 may compress the digital image data on a region-by-region basis. The encoder 300 may include a storage medium (not shown), such as buffer, that allows the digital image data to be compressed on a region-by-region basis. Also, depending on the compression technique, the parameter generator 350 outputs one or more types of encode parameters.

However, in encoder 300, a separate image compressor is not implemented for the generation of the final set of parameters. The digital image data is compressed repeatedly, as necessary, by the image compressor 310 using a set of parameters output by the parameter generator 350. The parameter generator 350 includes a processor 354 that outputs a first set of parameters. The digital image information is compressed by the image compressor 310 using the first set of parameters. The processor 354 then analyzes the bit rate generated for the compressed data. Based upon the analysis, the parameter generator 350 may adjust the first set of parameters to generate a second set of parameters or determine the first set of parameters as the final set of parameters.

In one embodiment of the encoder 300, the processor 354 determines whether the use of the first parameters results in any regions of compressed data with a selected data bit rate. For example, the processor 354 sets a condition to determine whether the bit rate is greater than a selected threshold. Here, the selected threshold is also set to be a maximum bit rate as allowed by a limited bandwidth and/or an average bit rate over a certain time period. If the condition is not met for a region, the processor 354 automatically changes or adjusts one or more than one of the parameters to generate the second set of parameters. The second set of parameters is then output as the first set of parameters and the region that failed the condition is compressed again by the image compressor 3 10 using the new first set of parameters. When the data bit rate meets the set condition, the processor 354 may output the generated first set of parameters as the final set of parameters and the digital image information may be compressed by the image compressor 310 using the final set of parameters. Alternatively, when the data bit rate meets the set condition, the processor 354 may determine the generated first set of parameters as the final set of parameters and stop compression of the region.

In another embodiment of the encoder 300, the processor 354 automatically displays to a system user, the regions of compressed data with a selected data bit rate.

For example, the regions with a data bit rate greater than a selected threshold may be displayed. Based upon the display, the system user may adjust one or more than one of the parameters to generate and output second set of parameters as the first set of parameters. Such regions are then compressed again by the image compressor 320 using the new first set of parameters. When there are no regions with a selected data bit rate, the processor 354 may output the generated first set of parameters as the final set of parameters to the compressor 310 for compression or may also simply terminate the compression.

The audio portion of the digital information is passed to the audio compressor 320 for compression and the back-end processor 330 processes the compressed information as in the encoder 200.

In the above embodiment, the first set of parameters may be a default set of parameters or may be selected manually as in the encoder 200. Also, the digital image and audio information may be stored in frame buffers (not shown) before compression.

Furthermore, similar to the encoder 200, one or more of the image compressor 310, audio compressor 320, back-end processor 330 and parameter generator 350 may be implemented on one or more than one ASICs and/or circuit card assemblies. One or more of the image compressor 310, audio compressor 320, back-end processor 330 and parameter generator 350 may be implemented by software, firmware, or a combination of software, firmware and hardware.

Figure 4:
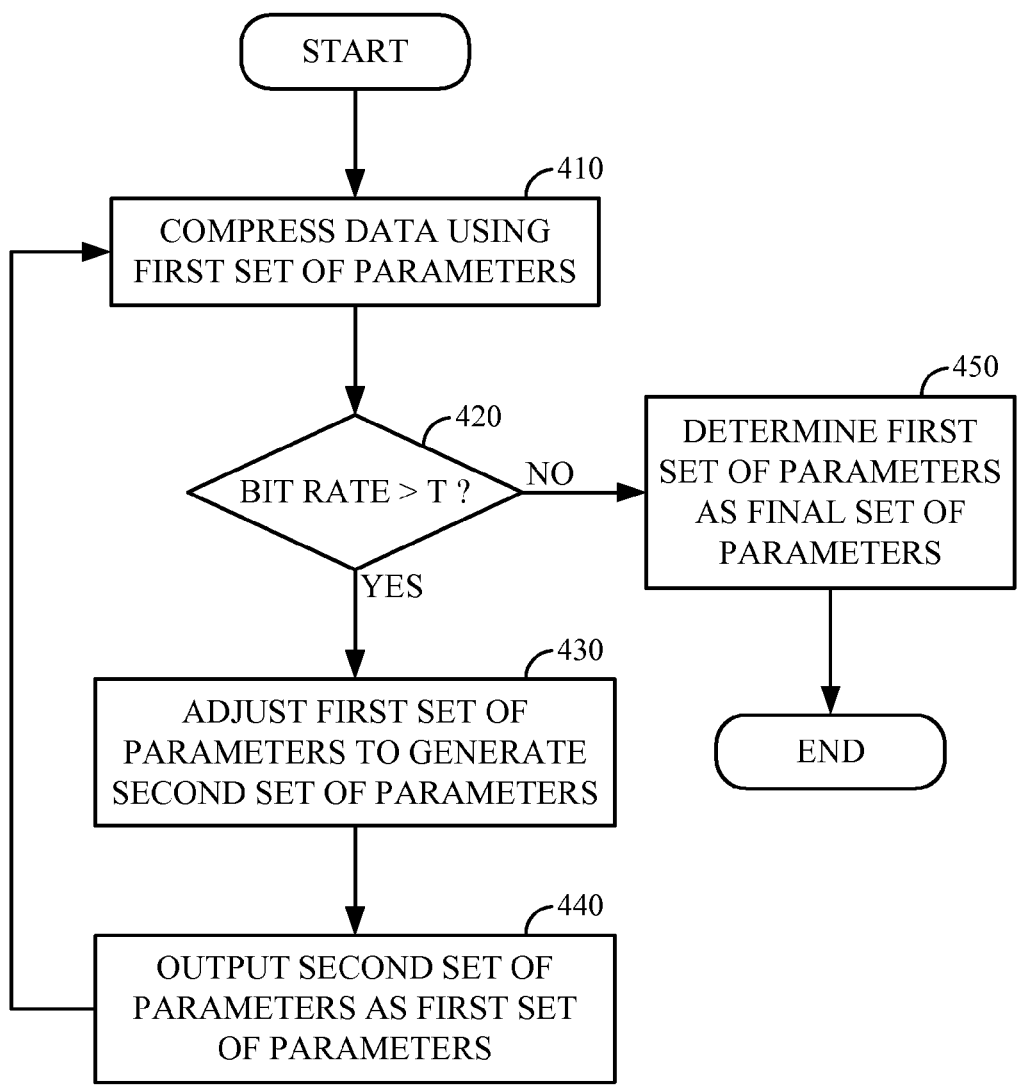
FIG. 4 is a block diagram of one embodiment for generating a set of encode parameters.

FIG. 4 shows one embodiment of a method for generating a set of parameters for image data compression. Upon receipt, the image data is compressed using a first set of parameters (block 410). As described above, the image data can be compressed on a region-by-region basis. Thereafter, the data bit rate resulting from the compression is compared with a selected threshold T (block 420). Here, the data bit rate can be analyzed and compared automatically by the system or can be analyzed and compared manually by a system user. Also, the threshold T is determined based on a bit rate such that the decoder 175 would not stop during decoding. Depending on the system, the selected threshold T is set to be a maximum bit rate as allowed by a limited bandwidth and/or an average bit rate over a certain time period.

If the data bit rate for a region is greater than the threshold, the first set of parameters is adjusted to generate a second set of parameters for the region (block 430).

The second set of parameters is output as the first set of parameters (block 440) and the digital image data corresponding to the region is compressed again using the new first set of parameters (block 410). The resulting data bit rate is again compared with the selected threshold (block 420). When a set of parameters results in a data bit rate for the image that is not greater than the threshold, that set of parameters is determined as the final parameters for compressing the image information (block 450).

Figure 5:
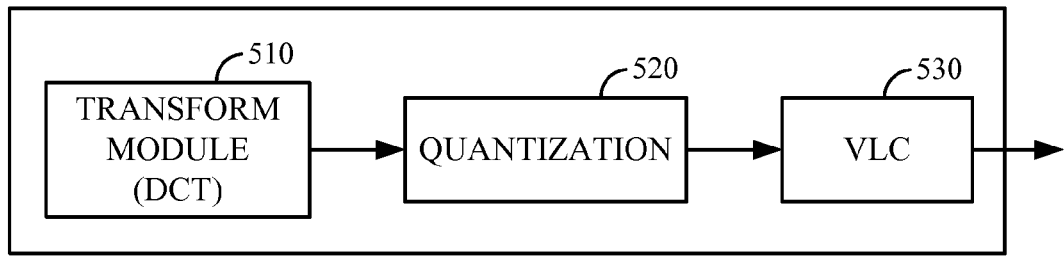
FIG. 5 shows one embodiment of an image compressor.

When adjusting the parameters, one or more parameters may be adjusted. Also, the types of parameters in the set of parameters is dependent upon the compression technique. FIG. 5 shows one embodiment of an image compressor 500.

The image compressor 500 comprises a transform module 510, a quantization module 520 and a variable length coding (VLC) module 530. The transform module 510 converts the digital image information from spatial to frequency domain and generates transform coefficients. The quantization module 520 quantizes the transform coefficients using quantization steps (Q-steps) and the VLC 530 compresses the quantized transform coefficients using a variable length coding technique.

In one embodiment, the transform module 510 may be a discrete cosine transform (DCT) module which converts a time-sampled signal to a frequency representation of the same signal. For example, the image compressor 500 processes a digital image signal using the adaptive size DCT (ABSDCT) technique described in U.S. Pat. Nos. 5,021,891, 5,107,345, and 5,452,104.

Each of the luminance and chrominance components is passed to a block interleaver (not shown). A 16×16 block is presented to the block interleaver, which orders the image samples within the 16×16 blocks to produce blocks and composite sub-blocks of data for DCT analysis. In one embodiment, one 16×16 DCT is applied to a first ordering, four 8×8 DCTs are applied to a second ordering, 16 4×4 DCTs are applied to a third ordering, and 64 2×2 DCTs are applied to a fourth ordering. The DCT operation reduces the spatial redundancy inherent in the image source. After the DCT is performed, most of the image signal energy tends to be concentrated in a few DCT coefficients.

For the 16×16 block and each sub-block, the transformed coefficients are analyzed to determine the number of bits required to encode the block or sub-block.

Then, the block or the combination of sub-blocks which requires the least number of bits to encode is chosen to represent the image segment. For example, two 8×8 sub-blocks, six 4×4 sub-blocks, and eight 2×2 sub-blocks may be chosen to represent the image segment. The chosen block or combination of sub-blocks is then properly arranged in order. The DCT coefficient values may then undergo further processing such as, but not limited to quantization and variable length coding, as shown in FIG. 5.

Furthermore, in one embodiment, the DCT coefficients can be quantized using weighting functions such as frequency weight masks (FWMs) optimized for the human eye. If used in combination with ABSDCT, there would be a different FWM table for each block size (16×16, 8×8, 4×4, and 2×2). There would also be at least three different sets of FWM tables, one for each component Y, Cb and Cr.

Also, in one embodiment, the VLC 430 may include a Huffman engine for Huffman coding the non-zero AC coefficient values along with the run length of zeros. Namely, a Huffman code represents the number of zeros preceding a non-zero AC coefficient and the size (minimum number bits required for representation) of that non-zero AC coefficient. Accordingly, the DCT coefficients are run-length coded to generate the different pairs of run lengths of zeros and corresponding size of the subsequent non-zero AC coefficient. Here, zigzag scanning or other scanning patterns can be used to increase the runs of zeros. Tables are then used to assign codes to the different run-length coded pairs based on the probabilities with which the codes occur. Short codes are assigned to pairs which appear more frequently and longer codes to pairs which appear less frequently. The Huffman code is appended with the actual value of the AC coefficient and transmitted.

For coding and decoding, Huffman code tables may be stored in both the encoder 120 and the decoder 175, respectively. Moreover, one or more Huffman code tables may be used. For example, when using the YCbCr color space, at least three different Huffman code tables can be used, one for each color component Y, Cb and Cr.

As described above, the digital image data can be compressed using one or a combination of many different techniques, including but not limited to, ABSDCT, quantization, quantization with FWM, and Huffman coding. The set of parameters depends on the compression technique and can be adjusted to affect the data bit rate. For example, by increasing the Q-steps, the data bit rate is reduced. Here, the increment for adjusting the Q-steps may be fixed or can be manually varied in any size. Also, a non-uniform set of Q-steps may be generated for a portion of an image frame.

If ABSDCT is implemented, the set of parameters would include a threshold (hereinafter called ABSDCT threshold) that controls how an image frame is divided into different block and/or sub-blocks. For example, the ABSDCT threshold may be a limitation on the number of 2×2 sub-blocks, 4×4 sub-blocks and/or 8×8 sub-blocks. In such case, increasing the ABSDCT threshold may improve the image quality, but would also increase the bit rate. Decreasing the ABSDCT threshold may affect the image quality but would reduce the bit rate.

If FWM tables are used for quantization, the set of parameters would include the FWM tables. Furthermore, if Huffman coding is used, the set of parameters would include Huffman code tables. Using different FWM tables and/or different Huffman code tables can affect and reduce the bit rate.

Therefore, in some embodiment, a set of parameters may include one or a combination of the Q-steps, the ABSDCT threshold, FWM tables and the Huffman code tables. Accordingly, if the data bit rate resulting from a set of parameters is greater than the selected threshold, one or more of the above parameters can be adjusted. For example, the Q-steps can be increased, the ABSDCT threshold can be increased, a different FWM table can be applied and/or a different Huffman code table can be used.

In adjusting the set of parameters including at least two parameters, one parameter may be adjusted at a time to find the set of parameters. Alternatively, more than one parameters may be adjusted at a time to find the set of parameters. Also, a statistical analysis may be used in the adjustment of the parameter(s). In such case, a statistics generator (not shown) may be implemented in the parameter generator 250 and 350 to generate a statistical analysis. Alternatively, the statistical analysis may be generated by the processor 254 or 354. Based upon the statistical analysis, the system or system user can adjust one or more parameters to reduce the bit rate.

Figure 6:
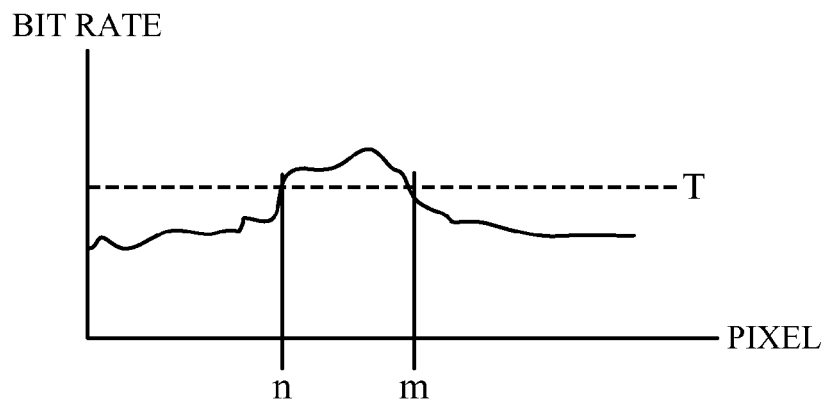
FIG. 6 shows a statistical analysis for an image frame.
Figure 7:
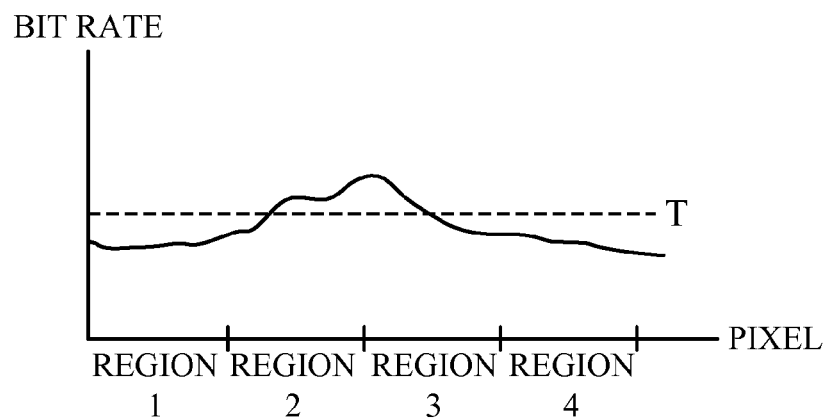
FIG. 7 shows a statistical analysis for a region-by-region compressed image data.

One embodiment of the statistical analysis may involve analyzing the bits per pixel for images. Assuming a selected bit rate threshold T, FIG. 6 shows bits per pixel analysis for one image frame. As shown, pixels n through m are above the bit rate threshold T. Accordingly, one or more parameters is adjusted and the image frame re-compressed. Moreover, FIG. 7 shows a bit rate analysis for images compressed on a region by region basis. Here, one region may be one or more 16×16 blocks, one or more slices, one or more half frames, or one or more image frames. As shown, region 2 and 3 are above the threshold. Accordingly, one or more parameters for the regions 2 and 3 can be adjusted and re-compressed to reduce the bit rate.

Further analysis may also be performed to determine the effectiveness of encode parameters. For example, assume an image frame having 16×16 data blocks and sub-block sizes of 8×8, 4×4 and 2×2 for ABSDCT. Statistic for an image frame may be 25% of 16×16 blocks, 5% 8×8 blocks, 20% 4×4 blocks and 50% 2×2 blocks. Here, division of an image frame with less than 50% of 2×2 blocks may be desired. In such case, the number of sub-blocks 2×2 can be limited by the ABSDCT threshold to reduce the bit rate. Also, the percentage of codes used in a Huffman code table during Huffman coding can also indicate the effectiveness of the Huffman code table. For example, if only 5% of the codes were used, use of a different Huffman code table may result in a reduced bit rate.

Therefore, the embodiments allows compression of the digital image information to be monitored and controlled to result in a selected bit rate. In particular, the compressed data bit rate can be limited such that no image portions results in a high bit rate that can potentially stop a decoder during decoding.

The compressed information is sent from the hub 102 to the theatre subsystem 104. The compressed information may be stored in the hub storage module 130 and physically transported. The compressed information or portions thereof may also be transmitted to the theatre subsystem 104 using any wireless and/or wired transmission methods. The wireless and/or wired transmission of the compressed information allows real time delivery and playback of a film.

When a program is to be viewed, the program information may be retrieved and transferred to the auditorium module 170 via the theater manager 160. Each auditorium module 170 may process and display a different program from other auditorium modules 170 in the same theater subsystem 104, or one or more auditorium modules 170 may process and display the same program simultaneously.

At the auditorium 170, the compressed information is decrypted, if necessary and decompressed using a decompression algorithm that is inverse to the compression algorithm used at the encoder 120. For example, if image compression is based on the ABSDCT algorithm, the decompression process may include variable length decoding, IDCT, and DCT block combiner deinterleaving. The decompressed image information is thereafter converted to a standard video format for display (which may be either an analog or digital format) and the image is displayed. The audio information is also decompressed and provided for playback with the image program.

The embodiments as described above allow monitoring, controlling and limiting the bit rate of the data compressed by an encoder. As a result, the probability that a decoder may stall due to a high data rate can significantly be reduced. Also, by controlling the data bit rate based upon a statistical analysis, the affect on the image quality would be minimized. Therefore, a more efficient decoding and playback of digital data is allowed.

It should be noted that the foregoing embodiments are merely exemplary and are not to be construed as limiting the invention. The description of the invention is intended to be illustrative, and not to limit the scope of the claims. As such, the present teachings can be readily applied to other types of apparatuses and many alternatives, modifications, and variations will be apparent to those skilled in the art.

What is claimed is:

1. A method for encoding digital image information comprising:
   generating a first set of parameters;
   compressing the digital image information on a region-by-region basis using the first set of parameters;
   determining whether using the first set of parameters results in any region of compressed data defining a bit rate greater than a threshold;
   if the first set of parameters does not result in any region of the compressed data defining the bit rate greater than the threshold, outputting the first set of parameters as a final set of parameters; and
   if the first set of parameters results in any region of the compressed data defining the bit rate greater than the threshold, adjusting the first set of parameters to generate a second set of parameters.

2. The method of claim 1, wherein compressing the digital image information comprises:
   converting the digital image information from spatial to frequency domain and generating transform coefficients;

quantizing the transform coefficients using first Q-steps; and variable length coding the quantized transform coefficients.

3. The method of claim 2, wherein the first set of parameters includes the first Q-steps and adjusting the first set of parameters comprises:

adjusting the first Q-steps to generate the second set of parameters.

4. The method of claim 2, further comprising quantizing the transform coefficients using the first Q-steps and first frequency weight mask (FWM) tables.

5. The method of claim 4, wherein the first set of parameters includes the first Q-steps and the FWM tables, and wherein adjusting the first set of parameters comprises:

adjusting either one or both the first Q-steps and the first FWM tables to generate the second set of parameters.

6. The method of claim 2, further comprising converting the digital image information using ABSDCT based on a first ABSDCT threshold.

7. The method of claim 6, wherein the first set of parameters includes the first Q-steps and the first ABSDCT threshold, and wherein adjusting the first set of parameters comprises:

adjusting either one or both the first Q-steps and the first ABSDCT threshold to generate the second set of parameters.

8. The method of claim 7, wherein variable length coding comprises Huffman coding the quantized transform coefficients using first Huffman code tables.

9. The method of claim 8, wherein the first set of parameters includes the first Q-steps and the first Huffman code tables, and wherein adjusting the first set of parameters comprises:

adjusting either one or both the first Q-steps and the first Huffman code tables to generate the second set of parameters.

10. The method of claim 1, further comprising adjusting the first set of parameters based on a statistical analysis to generate the second set of parameters.

11. The method of claim 10, further comprising adjusting the first set of parameters based on a bits per pixel analysis.

12. The method of claim 1, wherein the threshold depends on either one of a maximum bit rate as allowed a limited bandwidth or an average bit rate over a certain time period.

13. An apparatus for encoding digital image information comprising:

a parameter generator that generates a first set of parameters; and a compressor coupled to said parameter generator that compresses the digital image information on a region-by-region basis using the first set of parameters, wherein said parameter generator:

determines whether using the first set of parameters results in any region of compressed data defining a bit rate greater than a threshold;

if the first set of parameters does not result in any region of the compressed data defining the bit rate greater than the threshold, outputs the first set of parameters as a final set of parameters; and if the first set of parameters results in any region of the compressed data defining the bit rate greater than the threshold, adjusts the first set of parameters to generate a second set of parameters.

14. The apparatus of claim 13, wherein said compressor converts the digital image information from spatial to frequency domain and generates transform coefficients, quantizes the transform coefficients using first Q-steps, and uses variable length coding to quantize transform coefficients.

15. The apparatus of claim 14, wherein the first set of parameters includes the first Q-steps and the first Q-steps are adjusted to generate the second set of parameters.

16. The apparatus of claim 14, wherein the transform coefficients are quantized using the first Q-steps and first frequency weight mask (FWM) tables.

17. The apparatus of claim 16, wherein the first set of parameters includes the first Q-steps and the FWM tables, and either one or both of the first Q-steps and the first FWM tables are adjusted to generate the second set of parameters.

18. The apparatus of claim 14, wherein ABSDCT based on a first ABSDCT threshold is used to convert the digital image information.

19. The apparatus of claim 18, wherein the first set of parameters includes the first Q-steps and the first ABSDCT threshold, and either one or both the first Q-steps and the first ABSDCT threshold are adjusted to generate the second set of parameters.

20. The apparatus of claim 19, wherein variable length coding comprises Huffman coding the quantized transform coefficients using first Huffman code tables.

21. The apparatus of claim 20, wherein the first set of parameters includes the first Q-steps and the first Huffman code tables, and either one or both the first Q-steps and the first Huffman code tables are adjusted to generate the second set of parameters.

22. The apparatus of claim 13, wherein the first set of parameters are adjusted based on a statistical analysis to generate the second set of parameters.

23. The apparatus of claim 22, wherein the first set of parameters are adjusted based on a bits per pixel analysis.

24. The apparatus of claim 13, wherein the threshold depends on either one of a maximum bit rate as allowed a limited bandwidth or an average bit rate over a certain time period.

25. An apparatus for encoding digital image information, the apparatus comprising:

means for generating a first set of parameters;

means for compressing the digital image information on a region-by-region basis using the first set of parameters;

means for determining whether using the first set of parameters results in any region of compressed data defining a bit rate greater than a threshold;

if the first set of parameters does not result in any region of the compressed data defining the bit rate greater than the threshold, means for outputting the first set of parameters as a final set of parameters; and if the first set of parameters results in any region of the compressed data defining the bit rate greater than the threshold, means for adjusting the first set of parameters to generate a second set of parameters.

26. The apparatus of claim 25, wherein the means for compressing the digital image information comprises:

means for converting the digital image information from spatial to frequency domain and generating transform coefficients;

means for quantizing the transform coefficients using first Q-steps; and means for variable length coding the quantized transform coefficients.

27. The apparatus of claim 26, wherein the first set of parameters includes the first Q-steps and the means for adjusting the first set of parameters comprises:

means for adjusting the first Q-steps to generate the second set of parameters.

28. The apparatus of claim 26, further comprising wherein means for quantizing the transform coefficients uses the first Q-steps and first frequency weight mask (FWM) tables.

29. The apparatus of claim 28, wherein the first set of parameters includes the first Q-steps and the FWM tables, and wherein means for adjusting the first set of parameters comprises:
   means for adjusting either one or both the first Q-steps and the first FWM tables to generate the second set of parameters.

30. The apparatus of claim 26, wherein means for converting the digital image information uses ABSDCT based on a first ABSDCT threshold.

31. The apparatus of claim 26, wherein the first set of parameters includes the first Q-steps and the first ABSDCT threshold, and wherein means for adjusting the first set of parameters comprises:
   means for adjusting either one or both the first Q-steps and the first ABSDCT threshold to generate the second set of parameters.

32. The apparatus of claim 31, wherein variable length coding comprises Huffman coding the quantized transform coefficients using first Huffman code tables.

33. The apparatus of claim 32, wherein the first set of parameters includes the first Q-steps and the first Huffman code tables, and wherein means for adjusting the first set of parameters comprises:
   means for adjusting either one or both the first Q-steps and the first Huffman code tables to generate the second set of parameters.

34. The apparatus of claim 25, wherein the means for adjusting the first set of parameters adjusts the first set of parameters based on a statistical analysis to generate the second set of parameters.

35. The apparatus of claim 34, wherein the means for adjusting the first set of parameters adjusts the first set of parameters based on a bits per pixel analysis.

36. The apparatus of claim 25, wherein the threshold depends on either one of a maximum bit rate as allowed a limited bandwidth or an average bit rate over a certain time period.

37. A non-transitory computer-readable storage medium for encoding digital image information, the instructions comprising:
   code for generating a first set of parameters;
   code for compressing the digital image information on a region-by-region basis using the first set of parameters;
   code for determining whether using the first set of parameters results in any region of compressed data defining a bit rate greater than a threshold;
   code for outputting the first set of parameters as a final set of parameters if the first set of parameters does not result in any region of the compressed data defining the bit rate greater than the threshold; and
   code for adjusting the first set of parameters to generate a second set of parameters if the first set of parameters results in any region of the compressed data defining the bit rate greater than the threshold.

38. The non-transitory computer-readable storage medium of claim 37, wherein the code for compressing the digital image information comprises:
   code for converting the digital image information from spatial to frequency domain and generating transform coefficients;
   code for quantizing the transform coefficients using first Q-steps; and
   code for variable length coding the quantized transform coefficients.

39. The non-transitory computer-readable storage medium of claim 38, wherein the first set of parameters includes the first Q-steps and the code for adjusting the first set of parameters comprises:
   code for adjusting the first Q-steps to generate the second set of parameters.

40. The non-transitory computer-readable storage medium of claim 38, wherein the code for quantizing the transform coefficients uses the first Q-steps and first frequency weight mask (FWM) tables.

41. The non-transitory computer-readable storage medium of claim 40, wherein the first set of parameters includes the first Q-steps and the FWM tables, and wherein the code for adjusting the first set of parameters comprises:
   code for adjusting either one or both the first Q-steps and the first FWM tables to generate the second set of parameters.

42. The non-transitory computer-readable storage medium of claim 38, wherein the code for converting the digital image information uses ABSDCT based on a first ABSDCT threshold.

43. The non-transitory computer-readable storage medium of claim 42, wherein the first set of parameters includes the first Q-steps and the first ABSDCT threshold, and wherein the code for adjusting the first set of parameters comprises:
   code for adjusting either one or both the first Q-steps and the first ABSDCT threshold to generate the second set of parameters.

44. The non-transitory computer-readable storage medium of claim 43, wherein the code for variable length coding comprises code for Huffman coding the quantized transform coefficients using first Huffman code tables.

45. The non-transitory computer-readable storage medium of claim 44, wherein the first set of parameters includes the first Q-steps and the first Huffman code tables, and wherein the code for adjusting the first set of parameters comprises:
   code for adjusting either one or both the first Q-steps and the first Huffman code tables to generate the second set of parameters.

46. The non-transitory computer-readable storage medium of claim 37, wherein the code for adjusting the first set of parameters adjusts the first set of parameters based on a statistical analysis to generate the second set of parameters.

47. The non-transitory computer-readable storage medium of claim 46, wherein the code for adjusting the first set of parameters adjusts the first set of parameters based on a bits per pixel analysis.

48. The non-transitory computer-readable storage medium of claim 37, wherein the threshold depends on either one of a maximum bit rate as allowed a limited bandwidth or an average bit rate over a certain time period.

* * * * *